(12) United States Patent
Moll et al.

(10) Patent No.: US 10,369,504 B2
(45) Date of Patent: Aug. 6, 2019

(54) CARTRIDGE FLANGE AND FILTER SYSTEM

(71) Applicant: ULMATEC GMBH, Elchingen (DE)

(72) Inventors: Sebastian Moll, Senden (DE); Daniel Ehrhardt, Senden (DE)

(*) Notice: Subject to any disclaimer, the term of this patent is extended or adjusted under 35 U.S.C. 154(b) by 18 days.

(21) Appl. No.: 15/314,261

(22) PCT Filed: May 26, 2015

(86) PCT No.: PCT/EP2015/061543
§ 371 (c)(1),
(2) Date: Nov. 28, 2016

(87) PCT Pub. No.: WO2015/185388
PCT Pub. Date: Dec. 10, 2015

(65) Prior Publication Data
US 2017/0246569 A1   Aug. 31, 2017

(30) Foreign Application Priority Data

Jun. 2, 2014 (DE) .................. 10 2014 107 717
Jun. 2, 2014 (DE) .................. 20 2014 102 565 U

(51) Int. Cl.
*B01D 46/00* (2006.01)
*B01D 46/24* (2006.01)
*B01D 35/10* (2006.01)

(52) U.S. Cl.
CPC ..... *B01D 46/0005* (2013.01); *B01D 46/2403* (2013.01); *B01D 46/2411* (2013.01); *B01D 2265/05* (2013.01)

(58) Field of Classification Search
CPC ........ B01D 46/00; B01D 46/24; B01D 35/10; B01D 2201/305
USPC ................. 55/491, 498, 502, 508, 324, 334; 210/323.2, 493.2, 493.5
See application file for complete search history.

(56) References Cited

U.S. PATENT DOCUMENTS

| | | | | |
|---|---|---|---|---|
| 5,549,723 | A | * | 8/1996 | Terry ................. B01D 46/0005 55/493 |
| 5,912,370 | A | * | 6/1999 | McConkey ............. F01N 3/021 55/385.3 |
| 6,219,880 | B1 | * | 4/2001 | Worden ................... A47L 5/365 15/327.6 |
| 2003/0046914 | A1 | * | 3/2003 | Zia ........................ B01D 35/30 55/498 |
| 2003/0047075 | A1 | * | 3/2003 | Horton ............... B01D 46/0068 95/280 |
| 2004/0035094 | A1 | * | 2/2004 | Jersey ................ B01D 46/0005 55/478 |
| 2009/0249754 | A1 | * | 10/2009 | Amirkhanian ....... B01D 46/008 55/357 |
| 2014/0041346 | A1 | * | 2/2014 | Girondi .................. B01D 29/15 55/480 |

FOREIGN PATENT DOCUMENTS

EP    1772179 A2 *   8/2006   ............. B01D 46/24

* cited by examiner

*Primary Examiner* — Amber R Orlando
*Assistant Examiner* — Minh Chau T Pham

(57) ABSTRACT

The invention relates to a cartridge flange for fitting filter cartridges in filter systems, in particular industrial suction-extraction systems or air-filter systems.

13 Claims, 3 Drawing Sheets

CARTRIDGE FLANGE AND FILTER SYSTEM

CROSS REFERENCE TO RELATED APPLICATION

The present application is a National Phase entry under 35 USC 371 and claims priority as provided in 35 USC 120 to PCT/EP2015/061543 having an International Filing Date of May 26, 2015 and a Priority Date Claimed of Jun. 2, 2014, incorporated herein by reference in its entirety.

FIELD OF THE INVENTION

The invention relates to a cartridge flange for fitting filter cartridges in filter systems, in particular industrial suction-extraction systems or air-filter systems.

BACKGROUND OF THE INVENTION

Cartridge flanges of this type are usually part of a filter cartridge, in particular for suction-extraction systems or filter systems, respectively, in the industrial or commercial sector. The cartridge flange herein serves for connecting a filter cartridge in an exchangeable manner to a master suction-extraction system or filter system. A filter fabric, for receiving dust or the like, which in many instances is cylindrically configured and optionally folded and which hereunder is referred to as the filter unit, is usually connected to the cartridge flange.

As per the prior art, there is a very wide variety of filter systems for each of which correspondingly matching filter cartridges and thus cartridge flanges have to be kept readily available. The procurement and stocking of corresponding filter cartridges thus cause a significant investment in terms of logistics.

SUMMARY OF THE INVENTION

It is an object of the invention to provide a cartridge flange which, on the one hand, may be used in a universal manner and, on the other hand, may be used especially for a specific type of filter systems, in particular industrial suction-extraction systems or air-filter systems.

This object is achieved by a cartridge flange having the features as claimed in the independent and dependent claims provided herein. The dependent claims relate to advantageous variants and embodiments of the invention.

It is a further object of the invention to achieve a filter system which is provided with a cartridge flange which, on the one hand, may be used in a universal manner and, on the other hand, may be used especially for a specific type of filter systems, in particular industrial suction-extraction systems or air-filter systems.

A cartridge flange according to the invention, in particular for fitting a filter cartridge for filter systems, in particular industrial suction-extraction systems or air-filter systems, has an annular basic shape and at least one lug which is configured on the external circumference and which has at least one opening for receiving a bolt for fastening the filter cartridge to the filter system. The lug herein is configured in such a manner that bolts having dissimilar radial spacings from an imaginary center of the annular shape of the cartridge flange may engage for final fastening of the cartridge flange.

It is thus ensured by the solution according to the invention that a single filter cartridge may be used for suction-extraction systems which have dissimilar spacings of receptacle bolts for receiving filter cartridges from an imaginary center of an annular cartridge flange, such that, if applicable, only one size of filter cartridges having the corresponding specification according to the invention has to be kept readily available within a plant in which various suction-extraction systems are employed.

Additionally, the lug of a cartridge flange according to the invention may be configured in such a manner that a bolt may engage depending on the rotational orientation of the cartridge flange.

A comparatively simple potential for fitting of a cartridge flange according to the invention in a master system results from this variant. According to the variant described, it may be achieved by simple twisting in a specific direction or by a specific angular range that the cartridge flange is reliably connected to the suction-extraction system or the filter system, respectively. That is to say that identical filter cartridges which from one system to the other differ only in terms of the radial orientation of said filter cartridges in relation to the overall system are installed in suction-extraction systems or filter systems, respectively, having dissimilar bolt spacings.

In one preferred embodiment of a cartridge flange according to the invention, the at least one opening may be configured as a double keyhole having bit sides which point in dissimilar directions.

A double keyhole herein is understood to be an opening which is formed by one bore and slotted holes which adjoin thereto and which point in dissimilar directions and may be configured so as to be mutually offset. Continuing the analogy with a keyhole, the slotted holes adjoining the bore herein may be referred to as bit sides.

By configuring the opening as a double keyhole, it is achieved that the cartridge flange according to the invention may be placed in a simple manner onto a bolt which optionally is already provided with a nut, and may subsequently be twisted such that a simple potential for fastening results.

It is of advantage herein for the bit sides of the double keyhole each to have central longitudinal axes which display dissimilar spacing radii in relation to an imaginary center of the annular cartridge flange. In this way, a cartridge flange according to the invention may be used for various filter units as well as a special cartridge flange which matches only specific filter units.

The spacing radius of the centrical longitudinal axis of a first bit side in relation to an imaginary center of the annular cartridge flange herein may be in the range from 189.5 to 192.5 mm. In one preferred embodiment, the spacing radius of the first bit side may be 191 mm.

Moreover, the centrical longitudinal axis of a second bit side may preferably have a spacing radius in relation to an imaginary center of the annular cartridge flange in the range from 194.5 to 197.5 mm, in particular of 196 mm.

In one further advantageous embodiment, the at least one opening may be configured in the shape of a drop.

In this embodiment, in a manner similar to the variant which has been referred to as a double keyhole, a bolt having a nut may be introduced into the further part of the drop-shaped opening, and subsequently may first be latched by twisting and then secured by tightening the nut.

In another alternative embodiment, the opening is configured as an obliquely running slotted hole, wherein the slotted hole toward the ends thereof has dissimilar spacing radii in relation to an imaginary center of the cartridge flange. By way of such a profile, bolts having the most varied radial spacings in relation to an imaginary center of the annular cartridge flange may engage.

Alternatively, the lug of a cartridge flange according to the invention may have two openings which may have dissimilar spacing radii in relation to an imaginary center of the cartridge flange.

Furthermore, a cartridge flange according to the invention preferably has three lugs which are disposed so as to be offset by 120° on the external circumference.

Additionally, the lugs on the edges thereof may advantageously have an attachment which serves for preventing canting or jamming when a nut associated with the bolt is being tightened.

It is likewise of advantage for the flange body of the cartridge flange to have an opening through which air which has been filtered by a filter unit may flow out.

Advantageously, the flange body or the annular cartridge flange, respectively, on the lower side thereof displays a groove which additionally has annular ribs. On account thereof, an adhesive is distributed in such a manner that a form-fitting connection between the cartridge flange and the filter unit can be established. Additionally, a sealing foam may be received on a further groove which runs on either side, such that a seal on either side may be configured, thus enabling fitting of both sides of the cartridge flange having the associated filter unit in a suction-extraction system or filter system, respectively.

The cartridge flange may preferably be formed from plastics material, in particular from PA6, from light metal such as aluminum, from stainless steel and/or from steel, for example by way of an injection-molding method. Self-evidently, other manufacturing methods, such as casting methods, aluminum die-casting methods, and/or turning/milling, are also conceivable.

It goes without saying that the parameters mentioned herein relate to particularly advantageous embodiments and that further parameters which deviate from those already mentioned are likewise conceivable.

The lugs are preferably configured so as to be integral with the cartridge flange.

The annular basic shape of the cartridge flange has an annular external circumference on which the lugs may be configured or to which the lugs may be attached, respectively. The cartridge flange according to the invention is particularly suitable for fitting filter cartridges in industrial suction-extraction systems or air-filter systems.

The invention furthermore relates to a filter system, in particular an industrial suction-extraction system or an air-filter system, having receptacle means for fastening a filter cartridge and having a cartridge flange having an annular basic shape and at least one lug which is configured on the external circumference or on the external side of the cartridge flange, respectively. The lug has at least one opening for receiving one of the receptacle means which is configured as a bolt, for example. The lug herein may be configured in such a manner that bolts which have dissimilar radial spacings from an imaginary center of the annular basic shape of the cartridge flange may engage in the opening for final fastening of the cartridge flange.

Advantageous embodiments and refinements of the filter system are derived from dependent claims 2 to 18 relating to the cartridge flange, and in an analogous manner from the preceding and following descriptions of the cartridge flange.

BRIEF DESCRIPTION OF THE DRAWINGS

The invention will be explained in more detail by means of the following drawing.

In the drawings.

DETAILED DESCRIPTION OF THE INVENTION

Figure 1:
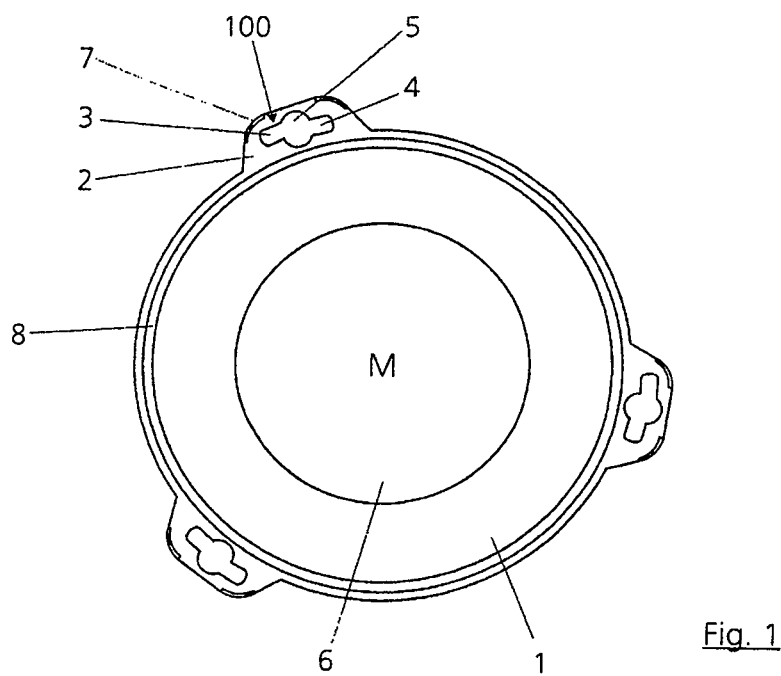
FIG. 1 shows a schematic illustration of a plan view of that side of a cartridge flange according to the invention that faces away from the filter unit (upper side)

A plan view of that side of a cartridge flange according to the invention that faces away from the filter unit is schematically illustrated in FIG. 1, that side henceforth being referred to as the front side. The cartridge flange according to the invention has an annular, preferably a toroidal, basic shape which henceforth will be referred to as the flange body 1, at least one lug 2 being attached to the external circumference of the latter.

The cartridge flange according to the invention has a flange body 1 which is configured in a toroidal manner and has a diameter in the range from 359 to 369 mm, in particular of 364 mm. In the example shown, three lugs 2 which are offset by 120° are located on the external side or on the external circumference, respectively, of the flange body 1. The three lugs 2 each have one double keyhole 100 having two bit sides 3 and 4, the latter being mutually opposite and being disposed so as to be mutually offset. Furthermore, the bit sides 3 and 4 in the present example have a radius in the range from 1.5 to 11.5 mm, in particular of 6.5 mm. Self-evidently, further radii are also conceivable. The bore 5 of the double keyhole 100 serves for receiving bolts which serve for connecting a filter which is connected to the cartridge flange to a master suction-extraction system. The bore 5 in the present exemplary embodiment has a diameter in the range from 8.5 to 14.5 mm, in particular of 11.5 mm. Self-evidently, other diameters are also conceivable. Furthermore, the lugs 2, on the corners thereof, each have attachments which serve as spaces and prevent canting and jamming during fitting.

One of the bit sides 3 or 4 is disposed on a first circumferential diameter, and the other bit side 4 or 3 is disposed on a second circumferential diameter. The bit side having the smaller circumferential diameter, presently the bit side 4, lies on a circumferential diameter in the range from 379 to 385 mm, in particular of 382 mm. Self-evidently, other circumferential diameters, are also conceivable. The bit side having the larger circumferential diameter, presently the bit side 3, which lies on a circumferential diameter in the range from 389 to 395 mm, in particular of 392 mm, corresponds to third-party filter units. The bit side 3 may also be considered to be the universal bit side of the double keyhole, meaning that this bit side may correspond to arbitrary filter units. In the example shown, the bit sides 3 and 4 are connected in a centric manner to a bore 5, thus forming the double keyhole 100. A receptacle bolt may first be introduced through the bore 5 during fitting, whereupon the cartridge flange may be fixed by way of a rotation about a specific angular range and by means of a nut associated with the bolt.

Furthermore, the cartridge flange according to the invention in the present example has an opening 6 by way of which air which passes through and is cleaned by a filter may be guided in the direction of an exhaust-air duct. The encircling groove 8 which serves for receiving a sealing foam, so as to establish a seal between the cartridge flange, having the associated filter unit, and the installation point in a suction-extraction system or filter system, respectively, is likewise readily identifiable in FIG. 1. This groove is also configured on the lower side of a cartridge flange according to the invention, that is to say on that side that faces the filter unit, such that the latter may be fitted regardless of the orientation thereof.

Figure 2:
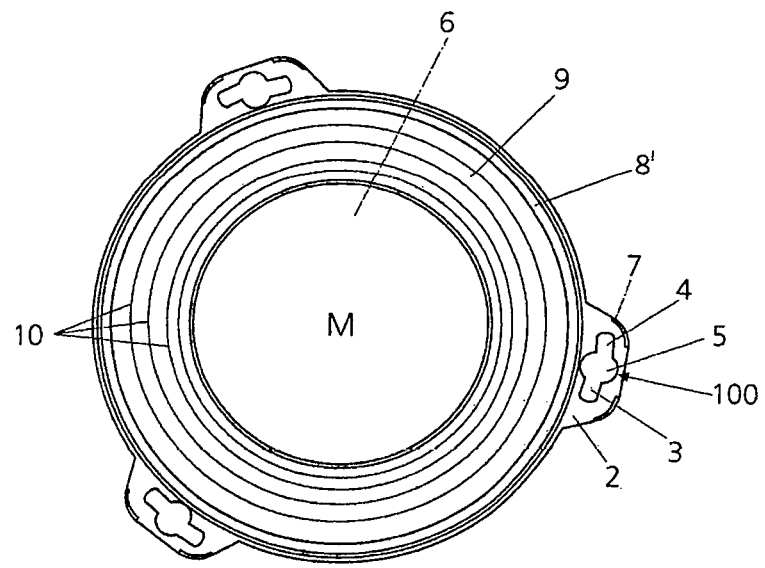
FIG. 2 shows a schematic illustration of a plan view of that side of a cartridge flange according to the invention that faces toward the filter unit (lower side)

In FIG. 2, an embodiment of a cartridge flange according to the invention is schematically illustrated from that side that faces the filter unit (from below). The cartridge flange according to the invention, on the lower side thereof, in relation to the corresponding groove 8 on the upper side, has a groove 8' in which a sealing foam may be incorporated. A further encircling groove 9 has encircling annular ribs 10 by way of which the flow behavior of the adhesive is improved and which thus serve for improving the adhesion of the non-woven filter fabric on the cartridge flange.

The attachment 7 on the lugs 2 can also be clearly identified on the lower side of the cartridge flange. The further reference numerals are analogous to the reference numerals used in FIG. 1.

Figure 3:
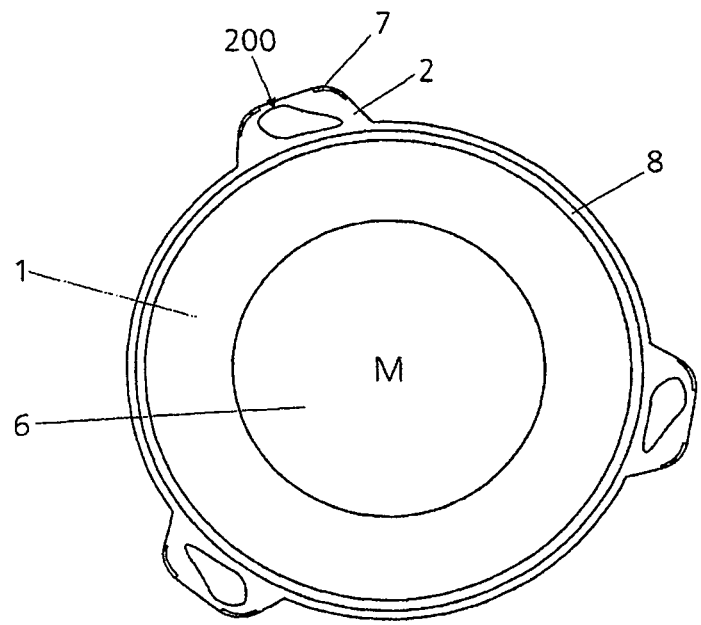
FIG. 3 shows a schematic illustration of a further embodiment of a cartridge flange according to the invention.

A further embodiment of the cartridge flange according to the invention is schematically illustrated in FIG. 3. In the present embodiment, the opening 200 of the lug 2 is configured in the shape of a drop. In this way, a bolt may be introduced on that side on which the drop-shaped opening has a larger radius, and by twisting the cartridge flange in the direction of that side on which the drop-shaped opening has a smaller radius may be fixed by means of a nut associated with the bolt. The further reference numerals are analogous to the reference numerals used in FIG. 1.

Figure 4:
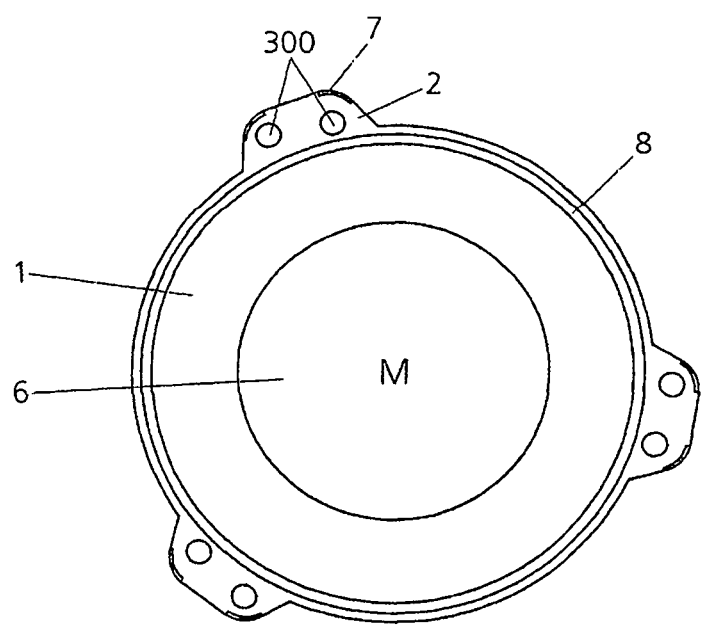
FIG. 4 shows a schematic illustration of an alternative embodiment of a cartridge flange according to the invention.

FIG. 4 illustrates a further design embodiment of the cartridge flange according to the invention. In this variant, the lug 2 has two openings 300 which have dissimilar radial spacings from an imaginary center (M) of the annular shape of the cartridge flange. The further reference numerals are analogous to the reference numerals used in FIG. 1.

Figure 5:
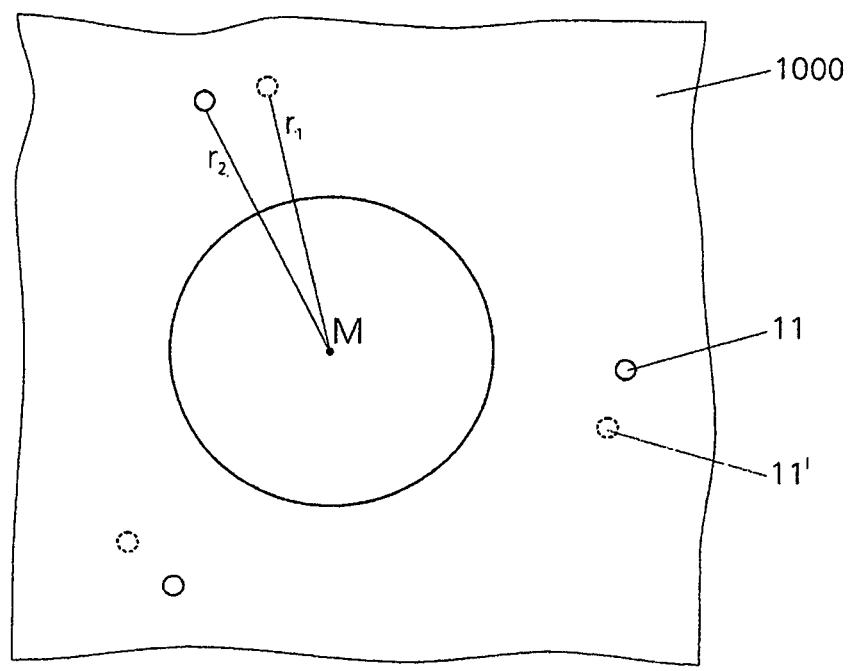
FIG. 5 shows a schematic illustration of a fragment of a filter system.

FIG. 5 schematically shows a fragment of a filter system 1000, having receptacle means 11 and 11' which in the present embodiment are configured as bolts 11 and 11', respectively. The bolts 11, 11' herein serve for fastening a filter cartridge having a cartridge flange according to the invention, which has an annular basic shape and at least one lug 2 which is configured on the external circumference or on the external side, respectively, to the filter system 1000. The at least one lug 2 has an opening for receiving a bolt 11 or 11', respectively. In FIG. 5, two alternative positionings of the bolts 11, 11' in relation to an imaginary center M are illustrated. The bolt 11 has a spacing $r_2$ from an imaginary center M. The bolt 11' has a spacing $r_1$ from an imaginary center M. The potential positions of the bolts 11 and 11', as shown in FIG. 5, are merely exemplary, further positions being conceivable.

For receiving a filter cartridge, a specific filter system will typically only have receptacle means or bolts, respectively, for fitting a filter cartridge, of which the radial spacings from an imaginary center of the cartridge flange are identical. The illustration of the bolt 11' in FIG. 5 by way of dashed lines is intended merely for indicating the potential positioning of bolts in the case of a further filter system, and thus for indicating the universal or general use, respectively, of the cartridge flange according to the invention.

A filter cartridge having a cartridge flange according to the invention may be positioned on or fastened to, respectively, the bolt 11 or alternatively also the bolt 11', for example. Final fastening of the filter cartridge having a cartridge flange according to the invention to a filter system by way of bolts is subsequently preferably performed using fastening means (not illustrated here) which may be configured as nuts, for example. It is self-evident that alternative fastening means may also be used.

We claim:

1. A cartridge flange for fitting filter cartridges in filter systems (1000), of industrial suction-extraction systems or air-filter systems, the cartridge flange comprising an annular basic shape and three lugs (2) disposed so as to be offset by 120° on the external circumference each said lug (2) having one opening (100, 200, 300) for receiving bolts (11, 11') for fastening the filter cartridge to the filter system (1000),
   wherein the lugs (2) are configured in such a manner that the bolts (11, 11') having dissimilar radial spacings ($r_1$, $r_2$) from an imaginary center (M) of the annular basic shape of the cartridge flange to engage for final fastening of the cartridge flange,
   wherein each lug (2) comprises edges and bit sides (3, 4) wherein the bit sides (3,4) point in dissimilar directions,
   wherein the bit sides (3, 4) each have centrical longitudinal axes which display dissimilar spacing radii in relation to an imaginary center (M) of the annular cartridge flange.

2. The cartridge flange as claimed in claim 1,
   wherein the lugs (2) are configured in such a manner that the bolts (11, 11') of dissimilar radial spacings ($r_1$, $r_2$) may engage depending on the rotational orientation of the cartridge flange.

3. The cartridge flange as claimed in claim 1,
   wherein the centrical longitudinal axis of a first bit side (3, 4) has a spacing radius in relation to an imaginary center (M) of the annular cartridge flange in the range from 189.5 to 192.5 mm.

4. The cartridge flange as claimed in claim 3,
   wherein the centrical longitudinal axis of the first bit side (3, 4) has a spacing radius of 191 mm.

5. The cartridge flange as claimed in claim 1,
   wherein the centrical longitudinal axis of a second bit side (3, 4) has a spacing radius in relation to an imaginary center (M) of the annular cartridge flange in the range from 194.5 to 197.5 mm.

6. The cartridge flange as claimed in claim 5,
   wherein the centrical longitudinal axis of a second bit side (3, 4) has a spacing radius in relation to an imaginary center (M) of the annular cartridge flange of 196 mm.

7. The cartridge flange as claimed in claim 1,
   wherein the opening of each lug (2) is configured as a double keyhole.

8. The cartridge flange as claimed in claim 1,
   wherein the lugs (2) on the edges thereof have an attachment (7).

9. The cartridge flange as claimed in claim 1,
   wherein a groove (9) is configured on the lower side of said cartridge flange.

10. The cartridge flange as claimed in claim 9,
    wherein encircling annular ribs (10) are disposed within the groove (9).

11. The cartridge flange as claimed in claim 1,
    wherein grooves (8, 8') which run on either side are configured to establish a seal.

12. The cartridge flange as claimed in claim 1, wherein said cartridge flange is formed from a plastics material or light metal, steel.

13. The cartridge flange as claimed in claim 1, wherein the cartridge flange is formed from a plastics material.

* * * * *